Nov. 30, 1965   H. WOLLMANN   3,221,311
ARRANGEMENT FOR ADJUSTING THE PERMANENT FLUX
OF A MAGNETIZABLE ELEMENT
Filed March 27, 1961                                     2 Sheets-Sheet 1

INVENTOR
H. Wollmann

BY *Paul W. Hemminger*

ATTORNEY

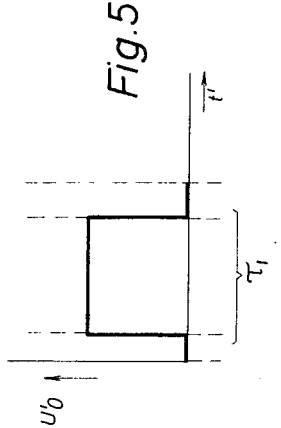
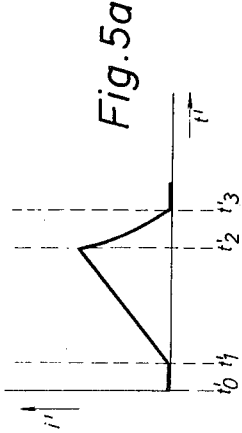
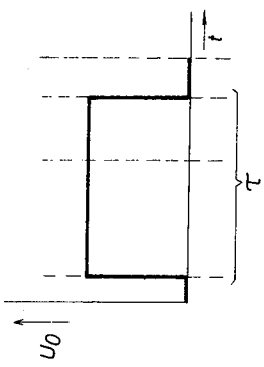
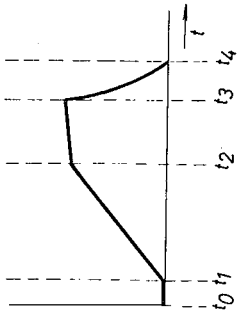
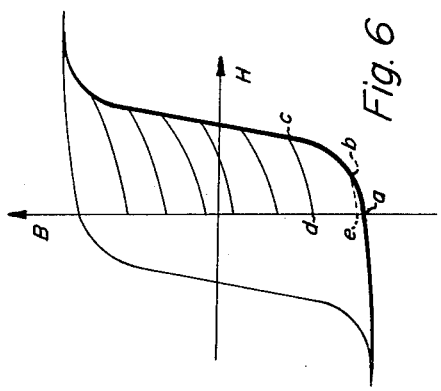

United States Patent Office 3,221,311
Patented Nov. 30, 1965

3,221,311
ARRANGEMENT FOR ADJUSTING THE PERMANENT FLUX OF A MAGNETIZABLE ELEMENT
Heinz Wollmann, Eckernfoerde, Germany, assignor to International Standard Electric Corporation, New York, N.Y., a corporation of Delaware
Filed Mar. 27, 1961, Ser. No. 98,504
Claims priority, application Germany, Apr. 8, 1960, St 16,337
3 Claims. (Cl. 340—174)

This invention relates to an arrangement for adjusting the permanent flux in a magnetizable element. Its principal object is to provide new and economical apparatus which will produce a larger number of equal permanent flux variations in a magnetizable element than heretofore accomplished.

In prior art arrangements, adjustment of the permanent flux of a magnetizable element was carried out by a flux imprintment with the adjusting current, at the time position of the changeover of the reversible flux variation to the irreversible flux variation, being differentiated and a starting pulse generated. This starting pulse marked the beginning of an adjusting pulse which lasted a predetermined period of time. Such differentiation was possible since the adjusting current during the reversible flux variation was of one slope and the adjusting current during the irreversible flux variation was of a different slope. Such an arrangement is disclosed in a prior application, Serial No. 70,272, filed November 18, 1960 and entitled "Circuit Arrangement and a Method of Adjusting the Permanent Flux in a Magnetizable Element."

In the noted application, the magnitude of each permanent flux variation was controlled by the pulse duration of the adjusting current after the noted differentiation occurred. Thus, the number of permanent flux variations possible in any given magnetizable element was controlled by the length of each adjusting pulse after the change from reversible to irreversible magnetization.

According to the present invention, an arrangement is provided for utilizing the impulse generated at the time position of the noted differentiation to terminate the adjusting current and thus provide a permanent flux variation of extremely small magnitude, thereby increasing the number of equal permanent flux variations.

The above-mentioned and other objects and features of this invention and the manner of attaining them will become more apparent and the invention will be best understood by reference to the following description of an embodiment of the invention taken in conjunction with the accompanying drawings comprising FIGS. 1 to 5 wherein:

FIGS. 4 and 4a show curves illustrating the time-voltage and time-current relationships according to prior art arrangement;

FIGS. 5 and 5a show curves illustrating the time-voltage and time-current relationships according to the present invention; and FIG. 6 is a hysteresis loop which helps explain the meanings of the terms "reversible flux" and "irreversible flux."

Before explaining the invention, it may be helpful to define the terms "reversible flux" and "irreversible flux" as used in this application. For this, reference is made to FIG. 6 which is a well known square loop hysteresis loop curve plotted on a B–H axis. As those skilled in the art know, a hysteresis loop is a curve showing two values of magnetic flux density changes in a magnetic material. The right-hand side of the loop shows the flux density changes as the magnetizing force increases in one polarity. The left-hand side shows the flux density changes as the magnetizing forces increase in an opposite polarity. Either way, the flux density experiences changes which may aptly be termed "reversible" and "irreversible." More particularly, from negative saturation, core flux density may be driven to point $b$ by one energizing pulse. When the pulse terminates, core flux density returns to the residual point $e$. Similarly, the next pulse may drive the core flux density to point $c$. When the pulse terminates, the density returns to the residual point $d$. In like manner, all succeeding pulses drive the core flux, step-by-step, toward positive saturation. Thus, the flux excursions over the distance $e$, $b$, for example, is herein described "reversible" and over the distance $b$, $c$ is herein described as "irreversible."

Figure 1:
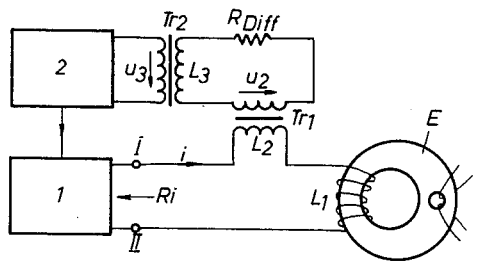
FIG. 1 shows a block diagram of the circuit arrangement of the invention.

Referring now to FIG. 1 of the drawings, a signal generator 1 is shown which generates a series of square-wave pulses each pulse having a time duration $\tau_1$. The internal resistance of this generator is indicated as $R_i$. The adjusting winding L1 of the magnetizable element E is connected in series with the primary winding L2 of the hybrid or differential transformer $Tr_1$ and both are connected to the output of generator 1. The current flowing in this series circuit is indicated as $i$.

A second hybrid or differentiating circuit is shown which includes resistor $R_{Diff}$, the winding L3 of differential transformer $Tr_2$ and the second winding of transformer $Tr_1$. The inductances of transformers $Tr_1$ and $Tr_2$ have linear characteristics while inductance $L_1$ has a non-linear characteristic.

The block indicated as 2 is an electronic switch which is utilized to control the generator 1.

The following relationships exist in the diagram of FIG. 1.

$$\frac{L_3}{R_{Diff}} \ll \tau_1$$

$$\frac{L_1+L_2}{R_i} \gg \tau_1$$

$$U_2 \sim \frac{di}{dt}$$

and $$U_3 \sim \frac{d^2 i}{dt^2}$$

When an impulse is generated by signal generator 1, an adjusting current $i$ starts to flow. This current increases during the reversible flux variation of the element E in a substantially linear fashion as indicated in FIGS. 4a and 5a between time positions $t_1$ and $t_2$ and time positions $t'_1$ and $t'_2$, respectively. At time position $t_2$, if the generated pulse continues, the permanent flux variations in element E become irreversible and the adjusting current increases slower. Thus, at position $t_2$ a bend appears in the curve of the current. The differentiating circuits $L_1/L_2$ and $R_{Diff}/L_3$, by twice differentiating the current, create a sharp impulse at time position $t_2$ as described in the above noted application. This sharp impulse operates electronic switch 2 and stops current $i$, prior to the termination of pulse duration $\tau_1$, thereby terminating the adjusting of the magnetizable element E.

It has been found that an irreversible flux variation has been effected upon the appearance of the sharp impulse at position $t_2$ due to inherent circuit delays and that a further continuation of the adjusting pulse is not necessary. Thus, the sharp impulse at the bend of the current curve is used for terminating the adjusting pulse rather than utilizing this sharp impulse to start a predetermined time interval as taught in a prior noted application. Thus, not only is a larger number of permanent magnetic flux variations possible but a savings in equipment for providing the predetermined interval is realized.

Figure 2:
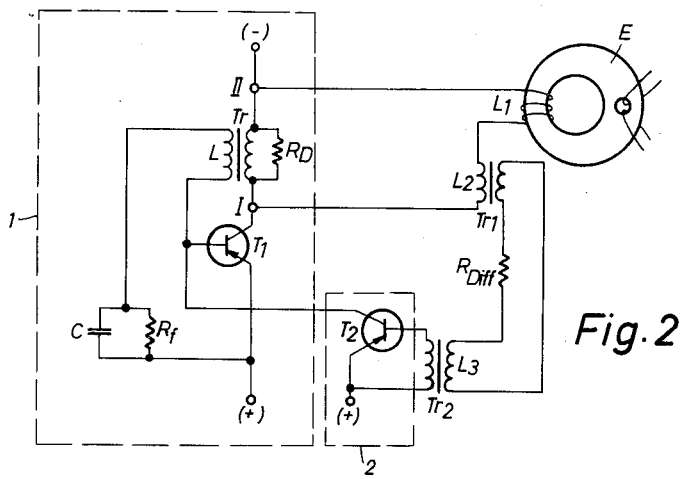
FIG. 2 shows a detailed circuit diagram of the circuit arrangement of FIG. 1 wherein a blocking oscillator type of signal generator is utilized.

Referring now to FIG. 2, a description of one embodiment of the invention will be given.

In FIG. 2, a blocking oscillator of a conventional type and comprising a transistor $T_1$ is used as a pulse generator.

The collector electrode of transistor $T_1$ is connected to the primary winding of the feedback transformer $T_r$ and parallel-connected attenuation resistor $R_D$, and then to the negative pole of a source of voltage. The attenuation resistance of this circuit is so dimensioned that it operates as a well-known blocking oscillator.

The emitter electrode of transistor $T_1$ is connected to the positive pole of the voltage source and to one side of the network $C/R_f$ which is connected to the primary winding of the feedback transformer $T_r$.

The pulse repetition frequency of the blocking oscillator is determined by suitably dimensioning C and $R_f$. The pulse duration of the generated pulse is determined by the dimensioning of the primary inductance L of transformer $T_r$ and of the capacitance C.

The generated adjusting pulse, as shown in FIG. 5, is derived across terminals I and II and is applied to the series connection of the adjusting winding $L_1$ of the magnetizable element E and the primary winding $L_2$ of the differential transformer $Tr_1$. A second differentiating circuit is formed of resistor $R_{Diff}$ and the differential transformer $Tr_2$.

The electronic switch transistor $T_2$ has its collector electrode connected to one end of the primary winding of transformer $T_r$ and to the base electrode of transistor $T_1$. The emitter electrode of $T_2$ is connected to a relatively high positive potential and the second winding of differential transformer $Tr_2$ is included in the base-emitter circuit of transistor $T_2$.

When the blocking oscillator 1 operates, an adjusting current $i$ flows through $L_1$ and $L_2$. As long as the current causes a reversible flux variation, the current rise is of one slope and when the current causes an irreversible flux variation, the current rise is of a different slope. The differentiating circuits $L_1/L_2$ and $R_{Diff}/L_3$ twice differentiate the current curve at time position $t'_2$ (FIGS. 5 and 5a) and generate a sharp impulse at this position. The winding of transformers $Tr_1$ and $Tr_2$ are polarized so that the generated sharp impulse applies a negative bias to the base electrode of transistor $T_2$ and unblocks it. When transistor $T_2$ is unblocked, the relatively high positive potential is applied to the base electrode of transistor $T_1$, thereby blocking it and terminating the adjusting current before the end of the duration of the pulse produced by the blocking oscillator 1. Thus, the sharp impulse generated when the flux variations changed from reversible to irreversible resulted in termination of the adjusting current.

When the generated pulse $\tau_1$ terminates, transistor $T_2$ is blocked and transistor $T_1$ is unblocked in preparation for receiving the next interval of adjusting current.

Figure 3:
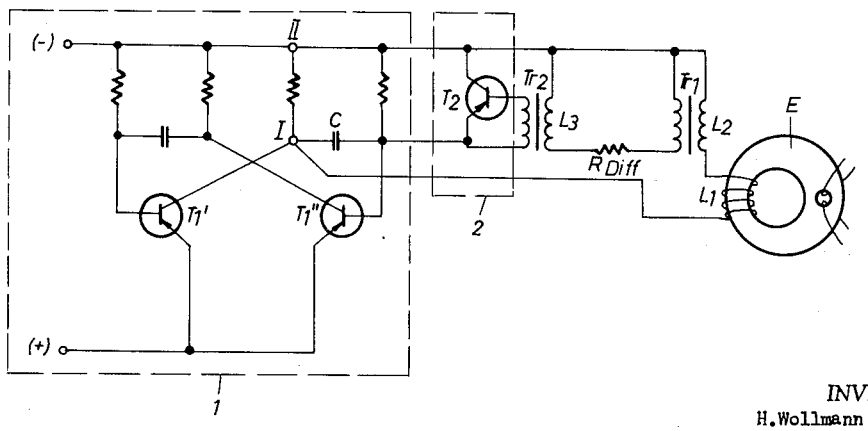
FIG. 3 shows a detailed circuit diagram of the circuit arrangement of FIG. 1 wherein a multivibrator type of signal generator is utilized.

FIG. 3 shows a second embodiment of the invention wherein a conventional multivibrator is provided utilizing transistors $T_1'$ and $T_1''$.

In the operating condition, an adjusting current flows through $L_1$ and $L_2$ and by double differentiation, the transistor $T_2$ is unblocked as described with reference to FIG. 2. When transistor $T_1$ is unblocked, a negative bias appears on the base electrode of transistor $T_1''$ causing the base electrode of transistor $T_1'$ to become positive. Thus, the multivibrator is switched off prior to the termination of the pulse $T_1$ and the adjusting process is terminated.

While we have described above the principles of the invention in connection with specific apparatus, it is to be clearly understood that this description is made only by way of example and not as a limitation to the scope of the invention set forth in the objects thereof and in the accompanying claims.

What is claimed is:

1. A circuit arrangement including a magnetizable element having a square loop core with a winding thereon, generator means for successively energizing said winding for providing a large number of storage steps in the magnetizable element, the characteristics of said element magnetization consists of reversible flux variations represented by a hysteresis loop excursion along the H axis and irreversible permanent flux variations represented by a hysteresis loop excursion along the B axis, said generator means generating adjusting pulses of a predetermined time duration, means for transmitting said adjusting pulses to said magnetic element, winding means on said element for responding to said pulses to produce adjusting current flow therein to produce reversible and irreversible permanent flux variations successively in said element, means for detecting the change from reversible to irreversible flux variation represented by a change from primarily H axis hysteresis loop excursion to primarily B axis hysteresis loop excursion, means responsive to said detection of said change for producing a stop pulse at the point in time where the said reversible flux variation changes to an irreversible permanent flux variation, and terminating means for terminating the said adjusting current flow in response to the production of said stop pulse.

2. A circuit arrangement as set forth in claim 1 wherein said generating means comprises a blocking oscillator including a first transistor which is normally unblocked and conductive and wherein the said terminating means includes a second transistor normally blocked and nonconducting, the said stop pulse altering the state of conductivity of the said second transistor and the said alteration of the state of conductivity of the second transistor altering the state of conductivity of the first transistor.

3. A circuit arrangement for providing a large number of storage steps in a magnetizable element whose magnetization consists of reversible and irreversible permanent flux variations comprising generator means for generating adjusting pulses of a predetermined time duration, means for transmitting said adjusting pulses to said magnetic element, winding means on said element for responding to said pulses to produce adjusting current flow therein to produce reversible and irreversible permanent flux variations successively in said element, means for producing a stop pulse at the point in time where the said reversible permanent flux variation changes to an irreversible permanent flux variation, terminating means for terminating the said adjusting current flow in response to the production of said stop pulse, said generating means comprises a multivibrator having a pair of transistors conducting alternately at a repetition rate determined by a capacitor, and wherein the said terminating means includes a further transistor whose state of conductivity is altered by the said production of a stop pulse, the said alteration of the state of conductivity of the said other transistor to altering the charge condition on said capacitor to cause the said alternate conduction of the pair of transistors to be effected.

References Cited by the Examiner

UNITED STATES PATENTS

| | | | |
|---|---|---|---|
| 2,925,958 | 2/1960 | Polzin et al. | 340—174 |
| 2,958,787 | 11/1960 | Hardenbergh | 340—174 |
| 2,990,540 | 6/1961 | Sublette et al. | 340—174 X |
| 3,015,732 | 1/1962 | Kuntzleman et al. | 340—174 |

IRVING L. SRAGOW, *Primary Examiner.*

JOHN F. BURNS, *Examiner.*